United States Patent
Dymshits et al.

(10) Patent No.: US 10,915,629 B2
(45) Date of Patent: Feb. 9, 2021

(54) SYSTEMS AND METHODS FOR DETECTING DATA EXFILTRATION

(71) Applicant: PAYPAL, INC., San Jose, CA (US)

(72) Inventors: Michael Dymshits, Holit (IL); David Tolpin, Ashdod (IL); Eli Strajnik, Be'er Sheva (IL); Benjamin Hillel Myara, Tel Aviv (IL); Liron Ben Kimon, Ofaqim (IL)

(73) Assignee: PayPal, Inc., San Jose, CA (US)

( * ) Notice: Subject to any disclaimer, the term of this patent is extended or adjusted under 35 U.S.C. 154(b) by 530 days.

(21) Appl. No.: 15/802,262

(22) Filed: Nov. 2, 2017

(65) Prior Publication Data
US 2019/0130100 A1   May 2, 2019

(51) Int. Cl.
*G06F 21/55* (2013.01)
*G06F 21/64* (2013.01)
*G06F 21/60* (2013.01)
*G06F 16/903* (2019.01)

(52) U.S. Cl.
CPC ...... *G06F 21/554* (2013.01); *G06F 16/90335* (2019.01); *G06F 21/604* (2013.01); *G06F 21/64* (2013.01)

(58) Field of Classification Search
CPC ............. G06F 21/554; G06F 16/90335; G06F 21/604; G06F 21/64
See application file for complete search history.

(56) References Cited

U.S. PATENT DOCUMENTS

| | | | | |
|---|---|---|---|---|
| 8,578,493 | B1* | 11/2013 | Cowan | G06F 21/554 709/224 |
| 9,386,028 | B2* | 7/2016 | Altman | H04L 63/145 |
| 10,104,113 | B1* | 10/2018 | Stein | H04L 63/1433 |
| 10,135,852 | B2* | 11/2018 | Chen | H04L 63/1441 |
| 10,198,579 | B2* | 2/2019 | Thakar | G06F 21/56 |
| 10,382,478 | B2* | 8/2019 | Rodriguez | H04L 63/1458 |
| 10,484,334 | B1* | 11/2019 | Lee | H04L 63/0218 |
| 2009/0263010 | A1* | 10/2009 | Zhang | G06K 9/6256 382/159 |
| 2016/0099961 | A1* | 4/2016 | Paugh | G06F 16/90335 726/23 |

(Continued)

OTHER PUBLICATIONS

Robinson Edward L, Introduction to Likelihood Statistics, Sep. 2016, Department of Astronomy and McDonald Observatory University of Texas at Austin, pp. 1-18.*

(Continued)

*Primary Examiner* — Robert B Leung
*Assistant Examiner* — Thomas Ho
(74) *Attorney, Agent, or Firm* — Haynes and Boone LLP (57) ABSTRACT

Systems and methods for detecting data exfiltration using domain name system (DNS) queries include, in various embodiments, performing operations that include parsing a DNS query to determine whether that DNS query is likely to contain hidden data that is being exfiltrated from a system or network. Statistical methods can be used to analyze the DNS query to determine a likelihood whether each of a plurality of segments of the DNS query are indicative of data exfiltration methods. If one or multiple DNS queries are deemed suspicious based on the analysis, a security action on the DNS query can be performed, including sending an alert and/or blocking the DNS query from being forwarded.

20 Claims, 2 Drawing Sheets

(56) References Cited

U.S. PATENT DOCUMENTS

| | | | |
|---|---|---|---|
| 2017/0041332 A1* | 2/2017 | Mahjoub | H04L 61/1511 |
| 2017/0134405 A1* | 5/2017 | Ahmadzadeh | H04L 63/1416 |
| 2017/0279831 A1* | 9/2017 | Di Pietro | H04L 63/1425 |
| 2018/0115582 A1* | 4/2018 | Thakar | H04L 63/1466 |
| 2018/0288086 A1* | 10/2018 | Amiri | H04L 63/1425 |
| 2018/0343272 A1* | 11/2018 | Khalil | H04L 63/1425 |
| 2019/0065738 A1* | 2/2019 | Kim | G06F 21/552 |
| 2019/0130100 A1* | 5/2019 | Dymshits | G06F 21/554 |

OTHER PUBLICATIONS

Yadav et al., 2010 ACM 978-1-4503-0057-5/10/11 Department of Electrical and Computer Engineering, "Detecting Algorithmically Generated Malicious Domain Names", pp. 48-61.*

Curtin et al, ARES '19, Aug. 26-29, 2019, "Detecting DGA domains with recurrent neural networks andside information".*

Bilge et al., Institute Eurecom, Sophia Antipolis, Jun. 14, 2011, "Exposure: Finding Malicious Domains Using Passive DNS Analysis".*

* cited by examiner

SYSTEMS AND METHODS FOR DETECTING DATA EXFILTRATION

TECHNICAL FIELD

Embodiments disclosed herein are related to systems and methods for detecting data exfiltration and more specifically to detecting data exfiltration using domain name system (DNS) queries.

BACKGROUND

Computing systems and networks have been the cornerstones of the modern information age. As more and more computing systems are being used and more and more data is being collected, the risk of data breaches increases. A data breach often includes the unauthorized copying (exfiltration) of sensitive, private, or otherwise valuable data to unauthorized parties (e.g., cybercriminals) outside of a computing system or networked system. The consequences of a data breach can often be quite significant and can expose the operator of a computing system to significant liability in terms of lost reputation, lost business, compensation to persons whose data was exfiltrated, mitigation costs, and/or the like.

BRIEF DESCRIPTION OF THE DRAWINGS

Various examples of the present disclosure will be understood more fully from the detailed description given below and from the accompanying drawings of various examples of the disclosure. In the drawings, like reference numbers may indicate identical or functionally similar elements. The drawing in which an element first appears is generally indicated by the left-most digit in the corresponding reference number.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

One approach often used for exfiltration is for an unauthorized person or entity to first gain access to a "secure" computing system. Once access is obtained, malware is installed that accesses data and then transmits the data to one or more computing systems external to the "secure" computing system. Because inbound and outbound traffic from a "secure" computing system is typically monitored and analyzed (e.g., using a firewall), the data is typically hidden in network traffic that looks legitimate so that it can get past the firewall.

The difficulty for the network administrator then becomes differentiating between the legitimate traffic and the illegitimate traffic being used to exfiltrate the data. This is often quite complicated as the legitimate traffic is not always predictable and/or does not conform to an easily recognized pattern. Accordingly, it would be advantageous to have systems and methods that reliably differentiate between legitimate and illegitimate traffic being transmitted out of a computing system and more specifically to be able to reliably differentiate between legitimate traffic and illegitimate traffic that contains exfiltrated data.

Systems, methods, and computer program products for detecting data exfiltration from computing systems are disclosed. Cybercriminals may attempt to gain access to sensitive data and exfiltrate it to an external computing system. The exfiltration is typically accomplished by embedding the data in outbound network traffic that appears otherwise legitimate to the computing system that is being breached. The consequences of a data breach and exfiltration are often quite significant.

In examples of the present disclosure, a network traffic analyzer, such as in a firewall, observes all outbound network traffic and analyzes it for patterns that are indicative of exfiltration. When outbound network traffic patterns exhibits signs of exfiltration, the network traffic analyzer can alert an operator, block the suspected network traffic, and/or take other security measures.

In examples of the present disclosure, the network traffic analyzer uses a training set of legitimate outbound network traffic to train a probability model that identifies the probability or likelihood that subsegments of outbound network traffic are likely to occur in legitimate outbound network traffic. A threshold of likelihood is then determined which can be used to differentiate between legitimate outbound messages and illegitimate outbound messages. When the network traffic analyzer receives an outbound message for analysis, it divides portions of the outbound message into segments and determines the likelihood that each of the segments is legitimate using the previously trained probability model. A composite score for the outbound message is then determined from the likelihoods of the segments. When the composite score is below the threshold of likelihood identified during the training, the outbound message is flagged as suspicious and a counter of the suspicious outbound messages is incremented. When the counter indicates that there have been too many (e.g., above a predetermined threshold number, as discussed in detail below with respect to FIG. 3) suspicious outbound messages, an exfiltration alert is issued and the suspicious outbound messages may additionally be prevented from being further transmitted.

In examples of the present disclosure, the network traffic analyzer monitors outbound messages that are DNS queries. Each DNS query is parsed to identify the lowest level subdomain string within the query. The lowest level subdomain string is then divided into segments that include one or more characters from the lowest level subdomain string. Each of the segments from the lowest level subdomain string is compared to a probability model trained from legitimate lowest level subdomain strings to determine its likelihood of occurrence in a legitimate lowest level subdomain string and the probabilities are then combined to form a composite score for the lowest level subdomain string. The composite score is then compared to a cutoff threshold determined from the legitimate lowest level subdomain strings to determine whether the DNS query being analyzed is suspicious.

Figure 1:
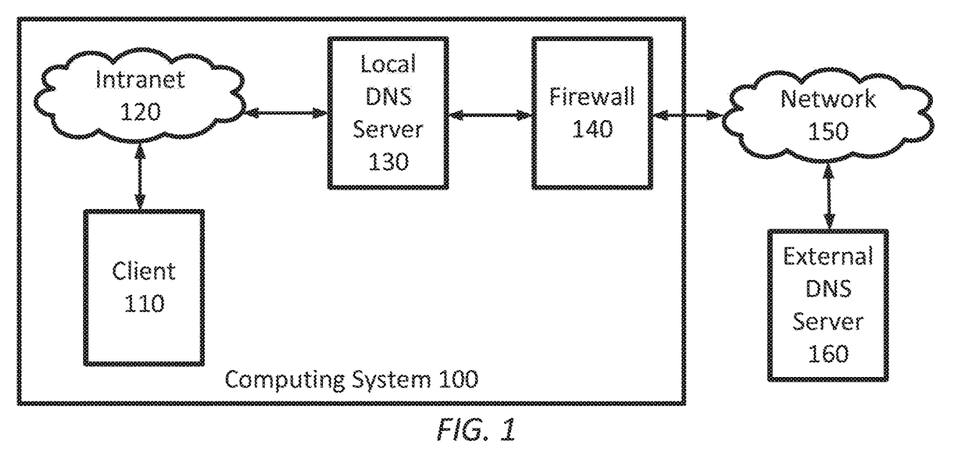
FIG. 1 is a simplified diagram of computing infrastructure used for DNS queries according to some embodiments.

FIG. 1 is a simplified diagram of computing infrastructure used for DNS queries according to some embodiments. As shown in FIG. 1, a client computing device 110 is coupled to an intranet 120. Intranet 120 provides a network infrastructure that couples client computing device 110 to other client computing devices, servers, and/or the like (not shown). And although FIG. 1 depicts client computing device 110 as a client computing device, client computing device 110 may also be a server. One example of the servers is local DNS server 130. The client computing devices (including client computing device 110), intranet 120, and the servers form a computing system 100. In some examples, computing system 100 is often operated under a unified authority, such as an information technology department, corporation, university, and/or the like. In some examples, intranet 120 may include one or more switches for forwarding layer 2 network traffic (e.g., Ethernet datagrams), one or more routers for routing layer 3 network traffic (e.g., IP packets), and/or the like. As further shown, computing system 100 is isolated from other computing networks (e.g., network 150) using a firewall 140. Firewall 140 inspects both inbound and outbound network traffic being routed to and from the client computing devices and/or servers located within the computing system. When firewall 140 detects unexpected or unauthorized network traffic (e.g., inbound or outbound network traffic on an unexpected TCP or UDP port), firewall 140 may block that network traffic, send alerts, and/or take other security responses. In some examples, firewall 140 is configurable and may be set-up with various policies to control which network traffic is allowed to pass and which network traffic is blocked and/or otherwise subjected to security responses. As an example, firewall 140 may be configured to block inbound file transfer protocol (FTP) traffic by blocking all inbound network traffic directed to TCP ports 20 and 21.

One of the many services that computing system 100 provides to its client computing devices and servers is domain name resolution. Domain name resolution is the process of converting a domain name string (e.g., www.interestingcompany.com) into an IP address. This allows uniform resource locators (URLs) to reference locations on the internet using text strings. This serves two main purposes. First it allows the URLs to be written in generally human friendly form rather than as long binary numbers in the form of IPv4 or IPv6 network addresses that are understood by routers. Second, it allows the IPv4 or IPv6 network addresses to change (i.e., change where on the internet the URL is actually located) without having to update every URL that refers to that location. In order for this to work, the internet (or any other network) typically employs a hierarchy of domain name servers (DNS servers) that collectively respond to DNS queries.

Consider the example of the URL "http://fundivision.interestingcompany.com/", which a user may receive as an embedded link in an email message. When the user views the email on client computing device 110 and clicks on the embedded link, the URL is transferred to a web browser on client computing device 110, which initiates a request for the web page at that URL. If the client computing device has recently exchanged network traffic with the server hosting the URL and has cached a copy of the corresponding IPv4 or IPv6 network address, client computing device 110 can route traffic directly to the server. However, the more typical scenario is that client computing device 110 does not know the IPv4 or IPv6 network address, so it submits a query to its local DNS server 130. If local DNS server 130 has recently learned the IPv4 or IPv6 network address for the server identified in the URL (e.g., because client computing device 110 or another client computing device or server in computing system 100 has requested the IPv4 or IPv6 network address for the server identified in the URL), local DNS server 130 returns the IPv4 or IPv6 network address to client computing device 110. If local DNS server 130 does not know the IPv4 or IPv6 network address, local DNS server 130 generates a DNS query using the domain name string and sends the DNS query to an external DNS server 160 coupled to computing system 100 using network 150. In some examples, external DNS server 160 may be able to respond with the requested IPv4 or IPv6 network address or may in turn pass the DNS query onto other DNS servers. In a typical situation, a DNS server for interestingcompany.com may eventually receive the DNS query and respond with the IPv4 or IPv6 network address for the server responsible for handling network traffic associated with web page traffic (http) for the "fundivision" subdomain of the higher level domain "interestingcompany.com." The response is then returned back to local DNS server 130, which then forwards the response to client computing device 110. Local DNS server 130 may further cache the response in anticipation of further DNS queries for the IPv4 or IPv6 network address corresponding to the domain name string "fundivision.interestingcompany.com".

In order to facilitate effective use of URLs and domain name strings within computing system 100, firewall 140 is generally configured to permit all outbound network traffic directed to UDP port 53 and/or other DNS ports, which is used by DNS servers to receive DNS queries. This, however, creates a security vulnerability in firewall 140 and computing system 100.

Consider the scenario where an unauthorized entity has gained access to computing system 100 and has installed software that can cause client computing device 110 to generate DNS queries. Client computing device 110 can issue an illegitimate DNS query for "encodeddata.interestingcompany.com" instead of, for example, "fundivison.interestingcompany.com". This DNS query would then be received by local DNS server 130 and then forwarded out to another DNS server, such as external DNS server 160, because local DNS server 130 would not have a cached copy of the corresponding IPv4 or IPv6 network address. Firewall 140 would allow the forwarded DNS query to pass onto network 150 and external DNS server 160. When the unauthorized entity also controls external DNS server 160 (which could be an otherwise legitimate DNS server), the DNS query with the "encodeddata" can be extracted from the domain name string in the query, decoded, and then used for an inappropriate purpose. External DNS server 160 can further provide an encoded response which may be used to direct additional malware activity on client computing device 110 or within computing system 100.

In some examples of DNS exfiltration, the encoded data is used to replace the lowest level subdomain in the domain name string and the unauthorized entity controls the DNS server associated with one of the domains above the lowest level subdomain (e.g., "interestingcompany.com" in the example above). In some examples of DNS exfiltration, the encoded data may replace other portions of the DNS query, such as intermediate domain levels and other fields of the DNS query. This approach may also be used to exfiltrate binary data by converting the binary data into legitimate domain name characters by using an encoding such as Base32, Base64, and/or the like. The encoding may also be used to disguise the exfiltrated data so that it does not have a pattern that matches known data patterns, such as social security numbers, credit card numbers, phone numbers, and/or the like.

Detecting exfiltration using the lowest level subdomain of domain name strings is difficult because there is no standardized naming convention for subdomains other than to restrict their character or symbol set and number of characters/symbols. For example, some legitimate organizations may use a subdomain naming scheme that identifies servers by their numbers, their function, and/or other non-obvious naming patterns (i.e., the subdomains are not always expected patterns such as "www", "email", webmail", "en", and/or the like.) This lack of a general naming pattern limits the effectiveness of previous approaches to detecting exfiltration using DNS queries because these previous approaches typically relied on pattern comparing mechanisms, like latent Dirichlet allocation, which rely on the ability to classify character strings into concept clusters that are not generally present in subdomain naming. The length limitations, however, do place limits on exfiltration as only a limited amount of data may be exfiltrated per DNS query so that a large number of illegitimate DNS queries are required to exfiltrate any significant quantity of data.

Accordingly, it would be advantageous to develop systems and methods that can differentiate between the legitimate DNS queries and the illegitimate DNS queries and then detect patterns involving a large number of illegitimate DNS queries. Machine learning and probability models are one possible approach as is discussed in further detail below.

Figure 2:
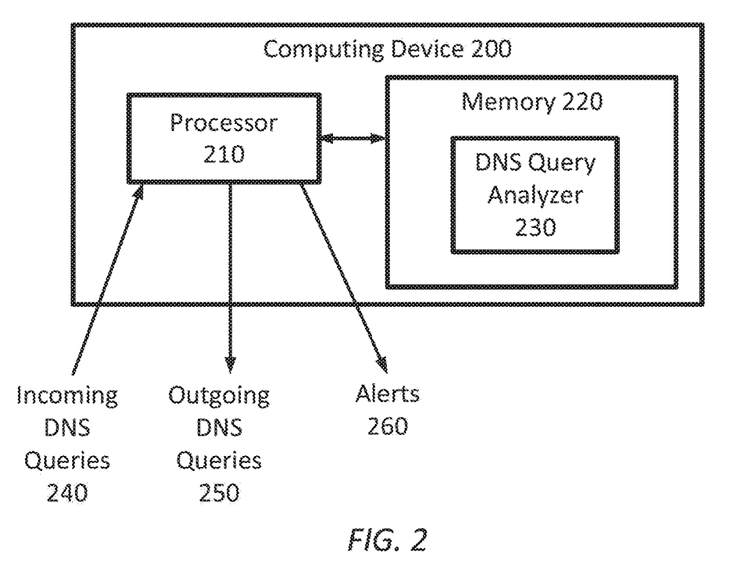
FIG. 2 is a simplified diagram of a computing device for detecting exfiltration using DNS queries according to some embodiments.

FIG. 2 is a simplified diagram of a computing device 200 for detecting exfiltration using DNS queries according to some embodiments. As shown in FIG. 2, computing device 200 includes a processor 210 coupled to a memory 220. Operation of computing device 200 is controlled by processor 210. And although computing device 200 is shown with only one processor 210, it is understood that processor 210 may be representative of one or more central processing units (CPUs), multi-core processors, microprocessors, microcontrollers, digital signal processors, graphics processing units (GPUs) field programmable gate arrays (FPGAs), application specific integrated circuits (ASICs), and/or the like in computing device 200. Computing device 200 may be implemented as a stand-alone subsystem and/or board added to a computing device or as a virtual machine. In some embodiments, control unit may be included as part a DNS server, such as local DNS sever 130, as part of a firewall, such as firewall 140, and/or operated separately from, but in coordination with the DNS server and/or the firewall.

Memory 220 may be used to store software executed by computing device 200 and/or one or more data structures used during operation of computing device 200. Memory 220 may include one or more types of machine readable media. Some common forms of machine readable media may include floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

As further shown in FIG. 2, memory 220 includes a DNS query analyzer 230 that may be used to support detection and blocking of DNS queries that are suspected of being used for exfiltration. DNS query analyzer 230 may include one or more application programming interfaces (APIs) for receiving configuration and/or instructions from network administrators, receiving training data, receiving and forwarding DNS queries, sending alerts, providing operational data including monitoring statistics, and/or the like. And although DNS query analyzer 230 is depicted as a software application, DNS query analyzer 230 may optionally be implemented using hardware, software, and/or a combination of hardware and software.

Computing device 200 through use of DNS query analyzer 230 is able to monitor DNS queries, determine whether the DNS queries are suspicious and may include exfiltrated data, and recognize patterns indicative of exfiltration. In its typical operation, computing device 200 and DNS query analyzer 230 receive incoming DNS queries 240, determine whether the incoming DNS queries 240 should be forwarded as outgoing DNS queries 250, and generate one or more alerts 260 when a likely exfiltration attempt using DNS is detected. The operation of DNS query analyzer 230 is described in further detail in FIG. 3.

In the context of the examples in FIG. 1 where computing device 200 is part of firewall 140, the incoming DNS queries 240 may correspond to the outbound DNS queries that are being generated by local DNS server 130 and passed on to firewall 140, which contain domain name strings to be resolved by one or more external DNS servers, such as external DNS server 160. The outgoing DNS queries 250 may correspond to the outbound DNS queries that firewall 140 permits to be forwarded to network 150. In the context of the examples of FIG. 1, where computing device 200 is part of local DNS server 130, the incoming DNS queries 240 may correspond to the DNS queries generated by, for example, client computing device 110 that local DNS server 130 cannot resolve (e.g., because the corresponding IPv4 or IPv6 network address is not cached) and the outgoing DNS queries 250 may correspond to the outbound DNS queries to be forwarded to firewall 140.

Figure 3:
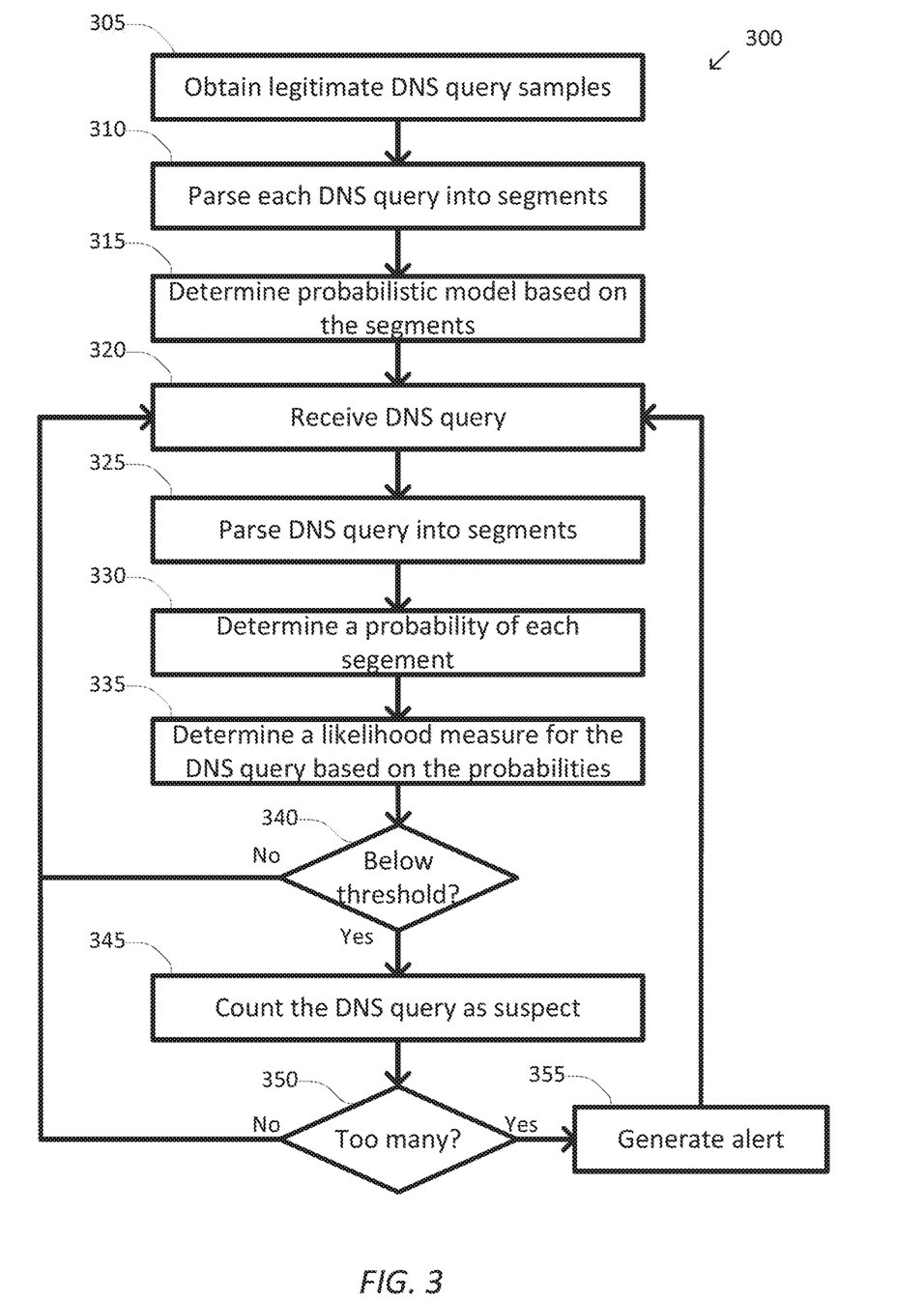
FIG. 3 is a simplified diagram of a method for detecting exfiltration using DNS queries according to some embodiments.

FIG. 3 is a simplified diagram of a method 300 for detecting exfiltration using DNS queries according to some embodiments. One or more of the processes 305-355 of method 300 may be implemented, at least in part, in the form of instructions stored on non-transitory, tangible, machine readable media. These instructions, when read from the media by one or more processors (e.g., the processor 210 in computing device 200), may cause the one or more processors to perform the operations one or more of the processes 305-355. In some embodiments, method 300 may be performed by an application, such as DNS query analyzer 230. In some embodiments, method 300 may be used to train a model for differentiating legitimate DNS queries from illegitimate DNS queries used for exfiltration and then use the model to monitor DNS queries being directed outbound from a computing system, such as computing system 100, in order to raise alerts when a pattern of outbound DNS queries is indicative of exfiltration.

At a process 305, samples of legitimate DNS queries are obtained. Because the embodiments of method 300 rely on training data to develop a probabilistic model of legitimate subdomain names, it is important to build that probabilistic model from examples of legitimate subdomains included in legitimate DNS queries. In some examples, the samples of legitimate DNS queries may be received from a trusted DNS server that can reliably confirm that the DNS queries do not include exfiltration data. In some examples, the samples of legitimate DNS queries may be received from DNS queries sent to a trusted DNS server. In some examples, the samples of legitimate DNS queries may be obtained as a subset of DNS queries that are directed to the subdomains of higher level domains that are included on a white list of legitimate domains. In some examples, the samples of legitimate DNS queries may be collected from a subset of the DNS queries generated by a computing system so that the probabilistic model generated may be customized for the patterns of legitimate outbound DNS queries generated by the computing system.

At a process 310, each DNS query obtained during process 305 is parsed into segments. Due to the lack of patterns typically found in subdomain names, it is typically impractical to build a probabilistic (or other) model based on subdomains as a whole. During process 310, the subdomain string (e.g., for the lowest level subdomain) is extracted from each of the DNS queries, such as by extracting it from the label field corresponding to the subdomain. The subdomain string is then split into segments. In some examples, the segments may correspond to each of the symbols or characters in the subdomain string. In some examples, the segments may correspond to groups of two or more symbols from the subdomain string, such as the first and second symbols, the third and fourth symbols, etc. when pairs of adjacent symbols are used. In some examples, the groups of symbols need not be adjacent, such as the first and last symbols, the second and next to last symbol, etc. In some examples, not all the symbols in the subdomain string may be included in a segment, such as omitting one of the symbols for a subdomain string having an odd number of symbols when pairs of symbols form the segments. In some examples, some symbols may be included in multiple segments. In some examples, the segments may include different numbers of symbols, but as is described further below, the probabilistic model is organized by the number of symbols in the segments.

At a process 315, a probabilistic model is determined based on the segments. A first aspect of the probabilistic model is related to the probability (e.g., likelihood) that each of the segments identified during process 310 occurs in legitimate subdomain strings. In some examples, the probability of each segment occurring may be determined by generating a histogram using each of the segments determined during process 310 and assigning a probability to each segment by the number of times the segment occurs out of the total number of segments. In some examples, separate probability distributions based on segment length may be determined so that the probabilities of segments of each length (e.g., 1, 2, 3, etc.) would be determined with respect to segments of the same length. Thus, a probability distribution for each length of segment may be determined. In some examples, multiple probability distributions for segments of the same length may be determined based on the pattern by which the segment is extracted from the subdomain string. For example, a probability distribution for segments derived from adjacent pairs of symbols might be determined separately from a probability distribution for segments derived from pairs of symbols selected according to some other approach (e.g., first and last, second and next to last, etc.).

A second aspect of the probabilistic model considers the likelihood that the combinations of symbols and segments in each of the legitimate subdomain strings is likely to occur. This is determined by aggregating together the probability of occurrence of each of the segments (e.g., single symbol or multiple symbol segments) that occur in a respective subdomain string to determine an overall likelihood measure of how well the respective subdomain string is matched to the probabilistic model being developed. In some examples, to reduce the effects of the length of the respective subdomain string (e.g., the number of segments within the subdomain string), a normalizing aggregation is used. In some examples, the normalizing aggregation may include determining a distance between the segments in the respective subdomain string and the segments in the probabilistic model for segments in the legitimate subdomains. In some examples, the distance may be determined using a cross entropy, which indicates a similarity between the probability distribution of the segments in the respective subdomain and the distribution of segments in the legitimate subdomains. In some examples, the cross entropy may be derived from the perplexity of the probability distributions of the segments in the respective subdomain and the segments in the legitimate subdomain. The perplexity is determined from Equation 1, where $H(x)$ indicates the entropy of the probability distribution of elements x from the probability distribution, $p(x)$ indicates the probability distribution of segments x, and N is the number of segments in a sample.

$$\log_2(\text{perplexity}) = \log_2(H(x)) = \log_2\left(2^{-\frac{1}{N}\log_2(p(x))}\right) = \log_2\left(p(x)^{-\frac{1}{N}}\right) = -\frac{1}{N}\log_2\left(\prod_x p(x)\right) = -\frac{1}{N}\sum_x \log_2(p(x))$$

Equation 1

The cross entropy may be derived from Equation 1 and can be determined using Equation 2, where x represents the set of segments in the respective subdomain string, $p(x)$ represents the probability that the segment x appears in the subdomain string (i.e., number of occurrences of x in the subdomain string divided by the number of symbols in the lowest level subdomain string), and $q(x)$ represents the probability that the segment x appears in the sample of legitimate subdomain strings (i.e., for the probabilistic model determined above). In some examples, segments not appearing in the respective subdomain string may be ignored for the cross entropy determination for the respective subdomain string because their $p(x)$ equals zero (i.e., there are no occurrences of them in the subdomain string). In some examples, the $q(x)$ for segments not appearing in the legitimate subdomain strings may be set to zero and/or set to some other default value, such as half of the probability of the least frequently occurring segment in the legitimate subdomain strings.

$$C = \log_2\left(\frac{1}{\text{perplexity}}\right) = -\sum_x \log_2(p(x)\log_2 q(x))$$

Equation 2

Once the likelihood measure is determined for each of the subdomain strings, a cutoff threshold for separating legitimate from illegitimate subdomain strings is determined. In some examples, the cutoff threshold is the lowest likelihood measure from among each of the likelihood measures so that all of the legitimate subdomain strings would have likelihood measures that are at or above the cutoff threshold. In some examples, the cutoff threshold may be set below the lowest likelihood measure by a margin. In some examples, the margin may be determined based on the statistical distribution of the likelihood measures, such as by setting it in range from 0.01 to 0.25 of a standard deviation of the likelihood measures. In some examples, the cutoff threshold may be set above the lowest likelihood measure so that a desired percentage (e.g., 90 to 99 percent) of the legitimate subdomain strings would be at or above the cutoff threshold. In some examples, the cutoff threshold may be determined by sorting the likelihood measures and selecting a value that would be between (e.g., halfway) the likelihood measures that are immediately above and below the line that would separate the desired percentage from the others. In some examples, confidence intervals associated with the statistical distribution of the likelihood measures may be used to set the cutoff threshold at the desired percentage. In some examples, when the distribution of the likelihood measures is approximately the normal distribution, the cutoff threshold may be set at 1.283 standard deviations below the mean for a desired percentage of 90 percent, 1.645 standard deviations below the mean for a desired percentage of 95 percent, and 2.27 standard deviations below the mean for a desired percentage of 99 percent. In some examples, the desired percentage may be determined based on an overall tolerance for false positives in marking a DNS query as suspected of exfiltration. In some examples, a low false positive rate for marking individual DNS queries as suspected of exfiltration is reasonable as it highly likely that a systematic exfiltration of data would result in a large number of DNS queries being suspected of exfiltration, which would not be characteristic of a small number of false positives from among a group of legitimate DNS queries.

At a process 320, a DNS query is received. Once the probabilistic model is determined using processes 305-315, it can be used to evaluate the DNS query to detect whether it is suspected of being used for exfiltration. In some examples, the DNS query may be an outbound DNS query for a computing system, such as an outbound DNS query sent by local DNS server 130 and/or one of the incoming DNS queries 240 received by computing device 200 to be examined for possible exfiltration.

At a process 325, the DNS query is parsed into segments. Using an approach similar to the segmentation performed during process 310, the DNS query received during process 320 is parsed into segments using the same segmentation pattern (e.g., pairs of adjacent symbols in the subdomain string, etc.) used to determine the probabilistic model during process 315.

At a process 330, a probability of occurrence of each of the segments parsed from the DNS query is determined. The probability of occurrence for a respective segment is determined by matching the respective segment from the probability model and noting the probability. In some examples, when the probability model does not include the respective segment (e.g., because the respective segment did not appear in the samples of legitimate DNS queries), the probability is determined as zero and/or as some other default value, such as half of the probability of the least frequently occurring segment in the legitimate subdomain strings.

At a process 335, the probabilities determined during process 330 are aggregated to determine a likelihood measure for the DNS query received during process 320. In some examples, the cross-entropy between the subdomain string from the DNS query received during process 320 and the probabilistic model determined during process 315 may be used to aggregate the probabilities determined during process 330. In some examples, the likelihood measure may be determined as C as described by Equation 2.

At a process 340, it is determined whether the likelihood determined during process 335 is below a threshold. In some examples, the threshold may correspond to the cutoff threshold determined during process 315. When the likelihood measure is at or above the threshold, another DNS query is received and processed by returning to process 320. When the likelihood measure is below the threshold, the DNS query is considered to be suspected of exfiltration and a further determination as to whether exfiltration is taking place begins with a process 345.

At the process 345, the DNS query is counted as being suspected of exfiltration. A running count of the number of DNS queries suspected of exfiltration is maintained by incrementing the count. In some examples, the count may be periodically reset to zero so that the count represents a number of suspected DNS queries over a known interval of time. In some examples, the known interval may correspond to one of a sequence of consecutive intervals with the count being reset to zero with the start of each interval or a sliding interval where sub-counts from a most recent group of subintervals are summed together. In some examples, the count may be associated with a sliding window over a most recent interval and/or a most recent number of examined DNS queries. In some examples, separate counts may be kept for different higher level domains so that the number of suspected DNS queries is tracked per higher level domain.

At a process 350, it is determined whether the count of suspected DNS queries is too many. In some examples, the count maintained by process 345 is compared to a configurable threshold to determine whether too many suspected DNS queries have been detected. In some examples, the configurable threshold corresponds to a maximum number of suspected DNS queries that are considered acceptable over the known interval of process 345. In some examples, the configurable threshold may correspond to a percentage of all the DNS queries received and analyzed by processes 320-340 during the known interval. In some examples, the configurable threshold may vary depending upon the higher level domain with which a respective count is being maintained so that the sensitivity to exfiltration may be adjusted on a per higher level domain basis, such as to account for a previous suspected history of exfiltration with that higher level domain. When too many suspected DNS queries are detected, an alert is generated using process 355. Otherwise, another DNS query is received and analyzed by returning to process 320.

At the process 355, an alert is generated. The alert indicates that an undesirably large number of DNS queries that are suspected of exfiltration has been detected. In some examples, the alert may be sent to one or more of a network administrator, a management device for a computing system, and/or the like. In some examples, the alert may generate one or more of an email, a text message, a phone call, a page, and/or the like. Once the alert is generated, another DNS query is received and analyzed by returning to process 320.

As discussed above and further emphasized here, FIG. 3 is merely an example which should not unduly limit the scope of the claims. One of ordinary skill in the art would recognize many variations, alternatives, and modifications. In some embodiments, the processes of method 300 may be applied to other portions of network traffic other than the subdomain strings of DNS queries. In some examples, the segments identified in processes 310 and 325 may be obtained from other portions of the DNS queries, such as other portions of the domain strings. In some examples, the segmenting and probabilistic models may be applied to other types of network traffic to provide a method of detecting exfiltration in those other types of network traffic.

In some embodiments, further processing of the DNS query received during process 320 takes place. In some examples, when the likelihood measure for the DNS query is at or above the threshold as determined during process 340, the DNS query may be forwarded to an external DNS server, such as external DNS server 160 and/or as part of the outgoing DNS queries 250. In some examples, when the likelihood measure for the DNS query is below the threshold, the DNS query may also be forwarded and/or it may be blocked and not forwarded (or some other security measure may be taken). In some examples, DNS queries with a likelihood measure below the threshold may only be blocked and/or be subject to another security measure after an alert is generated by process 355.

In some embodiments, method 300 may periodically repeat processes 305-315 to re-determine the probabilistic model applied during processes 330-340. In some examples, the probabilistic model may be re-determined to adapt to changes in legitimate DNS query patterns from the computing system, to adapt to a new set of legitimate DNS queries, and/or the like.

Some examples of computing devices, such as computing device 200, may include non-transitory, tangible, machine readable media that include executable code that when run by one or more hardware processors (e.g., processor 210) may cause the one or more processors to perform the processes of method 300. Some common forms of machine readable media that may include the processes of method 300 are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system comprising:
   a non-transitory memory; and
   one or more hardware processors coupled to the non-transitory memory and configured to read instructions from the non-transitory memory to cause the system to perform operations comprising:
      receiving, from a first device via a network associated with an entity, a domain name system (DNS) query;
      extracting, from the DNS query, a plurality of segments, wherein each segment in the plurality of segments comprises a portion of the DNS query;
      determining a first likelihood that the plurality of segments appears within a single DNS query;
      determining a second likelihood that each of the plurality of segments is associated with a first type of DNS query based on a predetermined set of DNS queries;
      aggregating the first and second likelihoods, wherein the aggregating comprises determining a cross entropy between the first likelihood and the second likelihood;
      comparing the aggregated first and second likelihoods to a cutoff threshold; and
      in response to determining that the aggregated first and second likelihoods is below the cutoff threshold, blocking the DNS query from being transmitted to a second device external to the network.

2. The system of claim 1, wherein each of the plurality of segments comprises one or more symbols from a lowest level subdomain string in the DNS query.

3. The system of claim 1, wherein each of the plurality of segments comprises a plurality of adjacent symbols from a lowest level subdomain string in the DNS query.

4. The system of claim 1, wherein the operations further comprise:
   in response to determining that the aggregated first and second likelihoods is below the cutoff threshold, incrementing a counter; and
   determining that the counter exceeds a count threshold, wherein the blocking the DNS query further based on the determining that the counter exceeds the count threshold.

5. The system of claim 4, wherein the counter is associated with a domain corresponding to the DNS query, and wherein the operations further comprise resetting the counter at periodic intervals.

6. The system of claim 1, wherein the operations further comprise determining the cutoff threshold based on a confidence interval associated with a distribution of segments in the predetermined set of DNS queries.

7. The system of claim 1, wherein the operations further comprise sending an alert comprising the DNS query to a third device within the network.

8. The system of claim 1, wherein the system comprises a firewall associated with the network.

9. A method comprising:
   receiving, via a network, a domain name system (DNS) query;
   extracting, from the DNS query, a plurality of segments;
   determining a first likelihood that the plurality of segments appears within a single DNS query;
   determining a second likelihood that each segment in the plurality of segments appears in a first type of DNS query;
   aggregating the first and second likelihoods, wherein the aggregating comprises determining a cross entropy between the first likelihood and the second likelihood;
   comparing the aggregated first and second likelihoods to a cutoff threshold; and
   in response to determining that the aggregated first and second likelihoods is below the cutoff threshold, blocking the DNS query from being transmitted to a device external to the network.

10. The method of claim 9, wherein each of the plurality of segments comprises a plurality of adjacent symbols from a lowest level subdomain string of the DNS query.

11. The method of claim 9, further comprising:
    in response to determining that the aggregated first and second likelihoods is below the cutoff threshold, incrementing a counter specific to a domain associated with the DNS query; and
    determining that the counter exceeds a count threshold, wherein the blocking the DNS query is further based on the determining that the counter exceeds the count threshold.

12. The method of claim 9, further comprising determining the cutoff threshold based on a desired confidence interval associated with a probability distribution of segments in a lowest level subdomain strings of each DNS query in the training set of DNS queries.

13. A non-transitory machine-readable medium having stored thereon machine-readable instructions executable to cause a machine to perform operations comprising:

receiving, via a network associated with an entity, a domain name system (DNS) query;

extracting a plurality of candidate segments from the DNS query, each of the candidate segments including characters from a lowest level subdomain string of the DNS query;

determining, for each candidate segment in the plurality of candidate segments, a likelihood that the candidate segment is associated with a first type of DNS query;

determining a cross entropy based on the likelihoods determined for each of the plurality of candidate segments;

comparing the cross entropy to a cutoff threshold;

in response to determining that the cross entropy is below the cutoff threshold, incrementing a counter;

comparing the counter to a count threshold; and in response to determining that the counter exceeds the count threshold based on the comparing, blocking the DNS query from being transmitted to a device external to the network.

14. The non-transitory machine-readable medium of claim 13, wherein each of the plurality of candidate segments includes adjacent characters from the lowest level subdomain string.

15. The non-transitory machine-readable medium of claim 13, wherein the operations further comprise:

in response to determining that the counter exceeds the count threshold, sending an alert to a device within the network.

16. The non-transitory machine-readable medium of claim 13, wherein the operations further comprise:

determining a plurality of legitimate segments from a predetermined set of DNS queries; and determining a probability distribution over the plurality of legitimate segments, wherein the determining the likelihood for each candidate segment in the plurality of candidate segments is further based on the probability distribution.

17. The non-transitory machine-readable medium of claim 16, wherein the operations further comprise:

determining the cutoff threshold based on a desired confidence interval associated with the probability distribution over the plurality of legitimate segments.

18. The non-transitory machine-readable medium of claim 13, wherein the counter corresponds to a domain associated with the DNS query.

19. The non-transitory machine-readable medium of claim 18, wherein the operations further comprise blocking network traffic from the domain.

20. The non-transitory machine-readable medium of claim 13, wherein the operations further comprise resetting the counter at a periodic interval.

* * * * *